April 5, 1932. H. P. McCANN 1,852,664
CONVEYER AND OPERATING MECHANISM THEREFOR
Filed Oct. 26, 1928 6 Sheets-Sheet 1

Inventor
Harry P. McCann
By Hill, Brock & West
Attorney

April 5, 1932. H. P. McCANN 1,852,664
CONVEYER AND OPERATING MECHANISM THEREFOR
Filed Oct. 26, 1928 6 Sheets-Sheet 2

Inventor
Harry P. McCann
By Hull, Brock West
Attorney

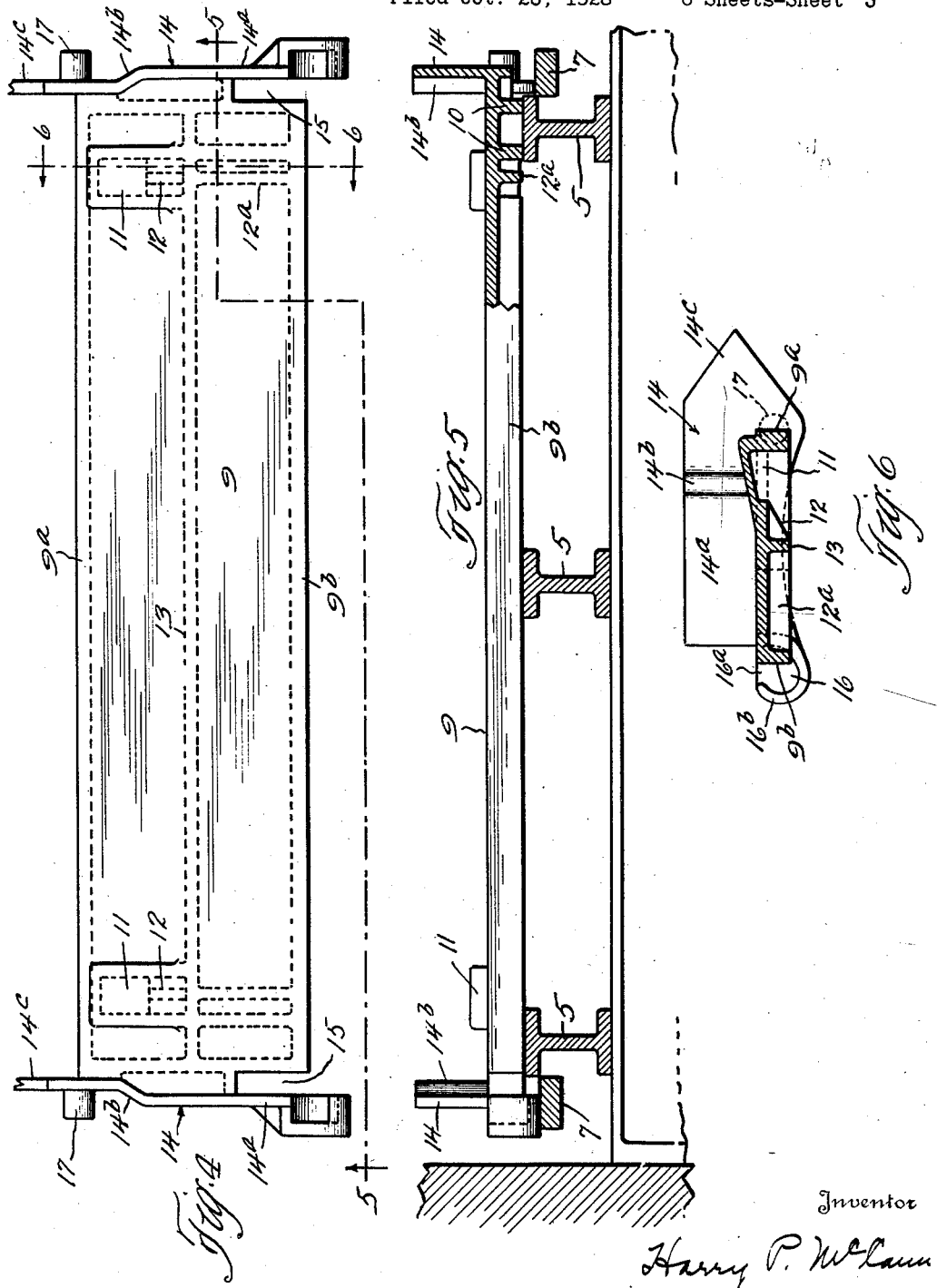

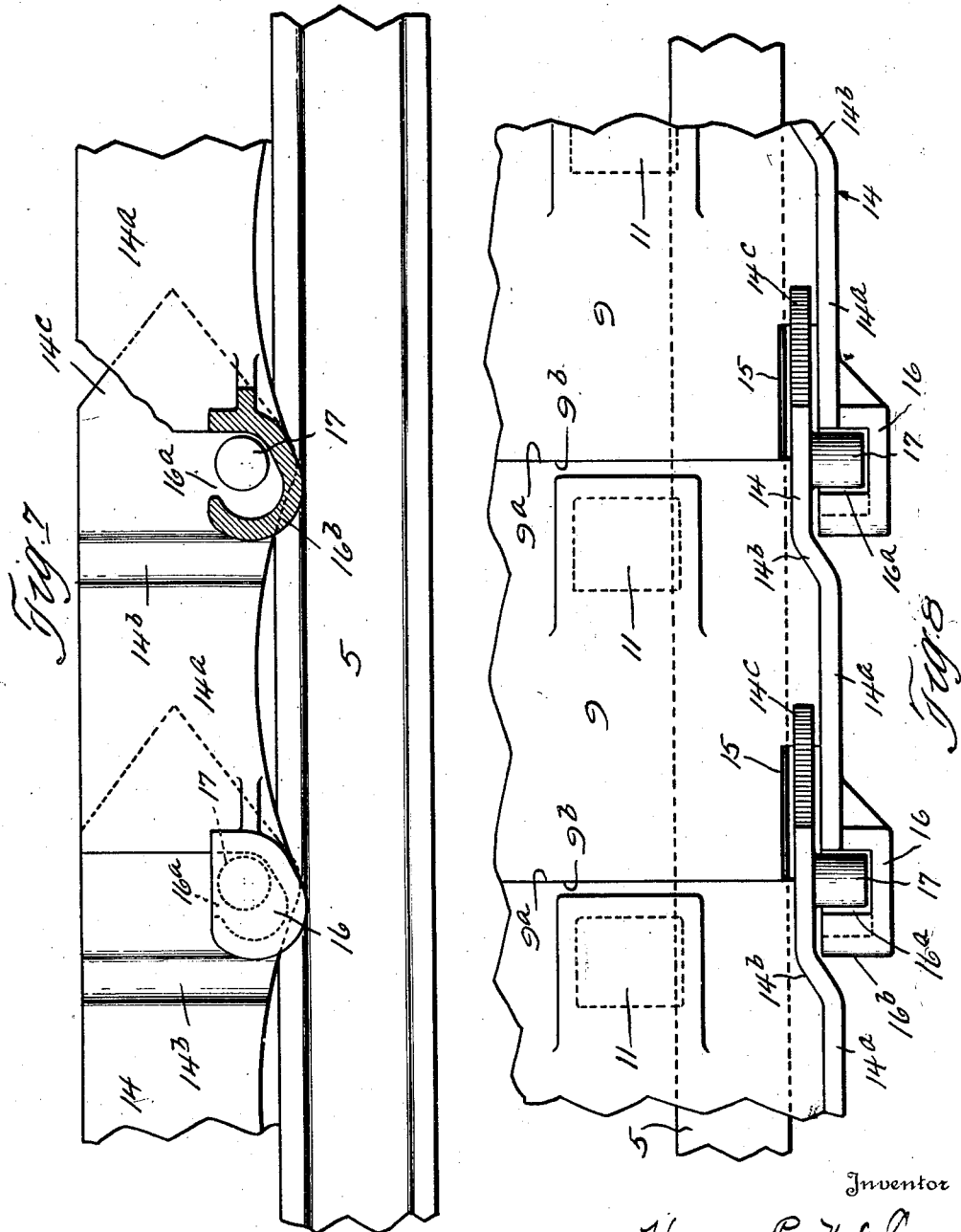

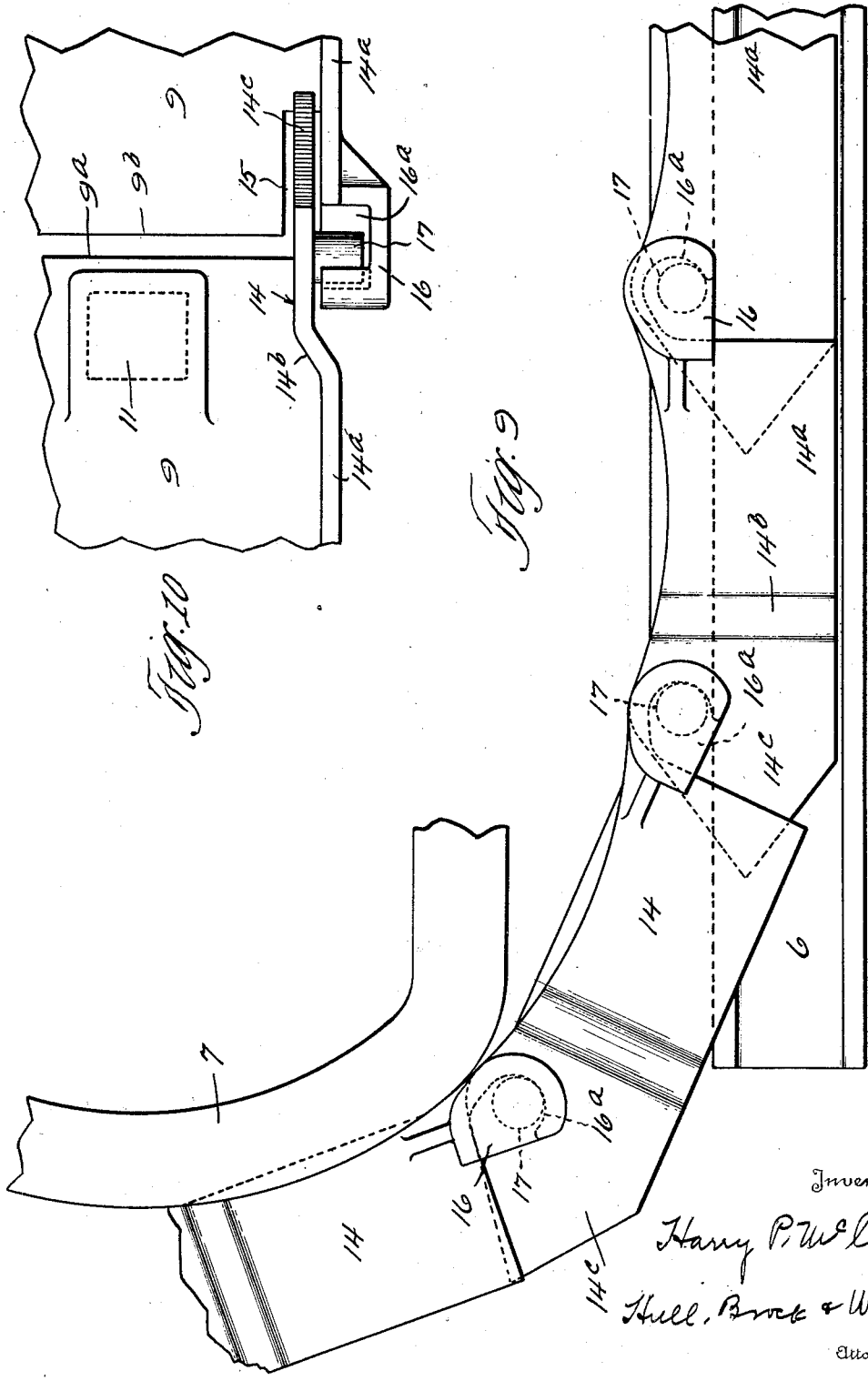

April 5, 1932.　　　　H. P. McCANN　　　　1,852,664
CONVEYER AND OPERATING MECHANISM THEREFOR
Filed Oct. 26, 1928　　6 Sheets-Sheet 6
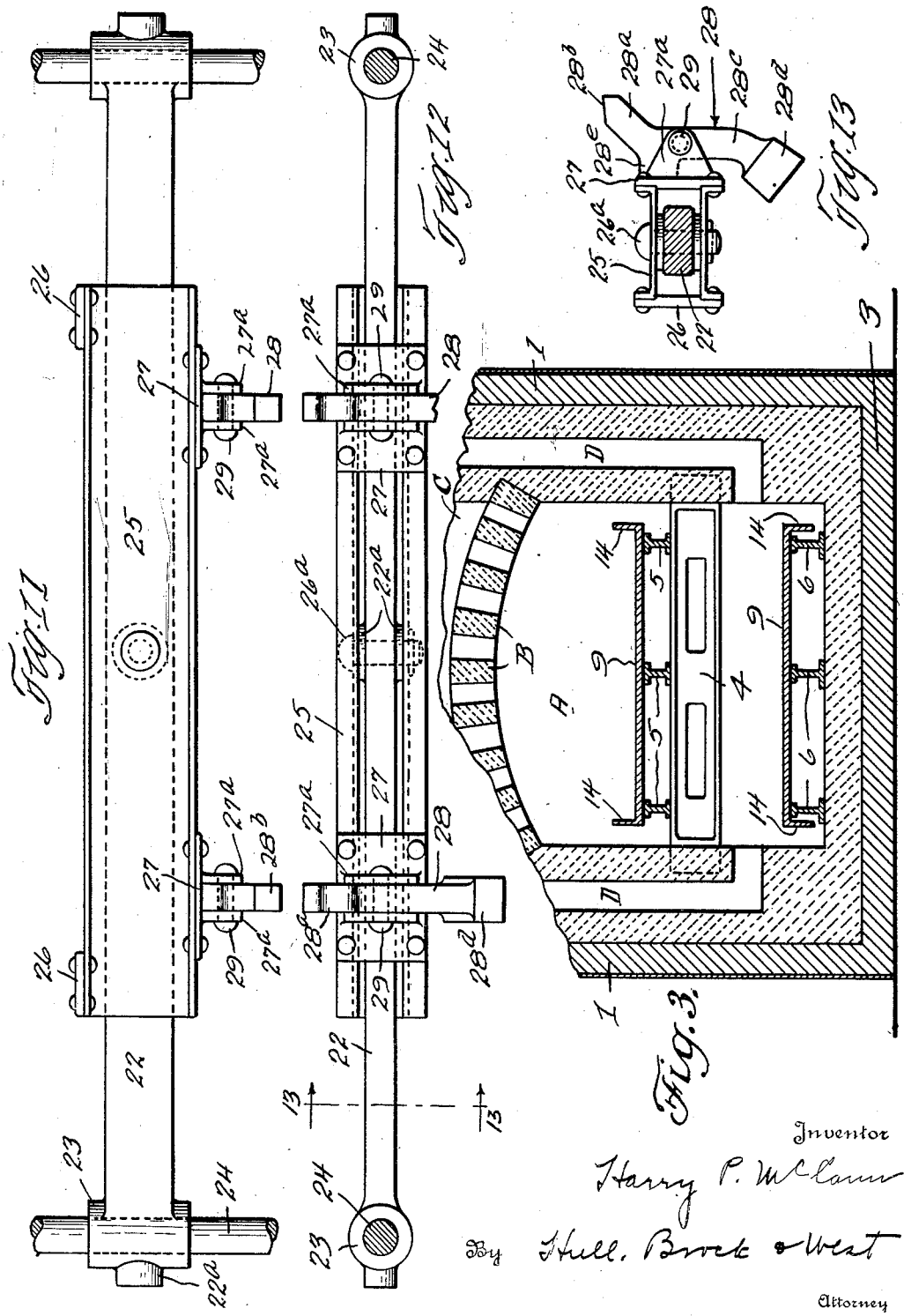

Patented Apr. 5, 1932

1,852,664

UNITED STATES PATENT OFFICE

HARRY P. McCANN, OF CLEVELAND, OHIO

CONVEYER AND OPERATING MECHANISM THEREFOR

Application filed October 26, 1928. Serial No. 315,135.

This invention relates to conveyers and conveyer-operating mechanisms, and more particularly to such conveyers and operating mechanisms therefor as are adapted for the feeding of articles through heat-treating furnaces, such as annealing furnaces.

It has been proposed to use for the specific purpose mentioned conveyers consisting of a series of pans, connected by flexible joints, and to advance the pans thus connected, through the furnace by means of an intermittently operating-pulling action. This, however, has subjected the joints to considerable tension and, as the joints or connections are usually narrow, they wear in a comparatively short time, causing separation between adjacent pans and leading to the breaking of the connections.

It is the general purpose and object of the invention to improve the manner of constructing and connecting the pans, as well as the manner of intermittently moving the pans and the conveyer of which they form a part, whereby the objections noted will be overcome and advantages, to be explained hereinafter, will be realized.

Figure 1:
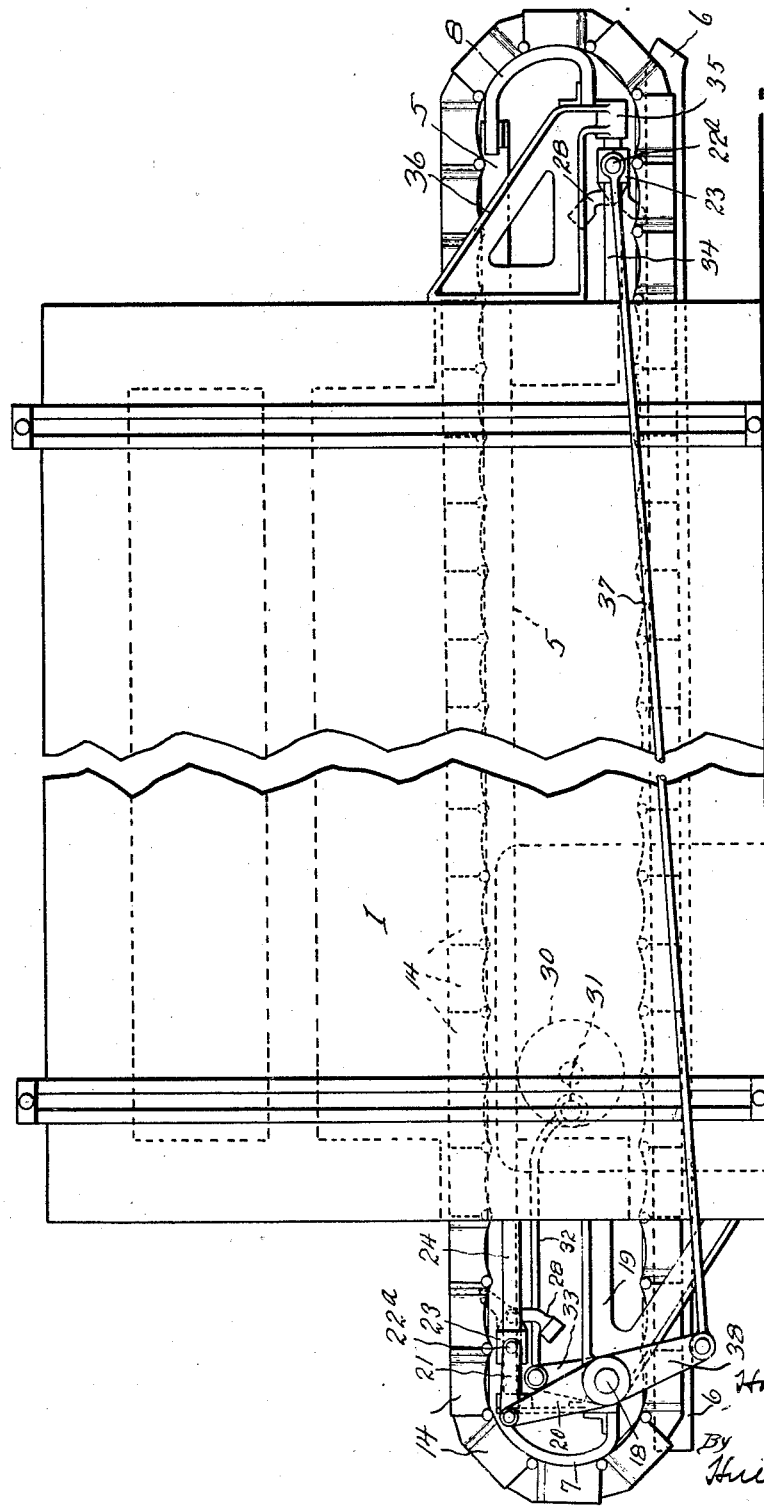
Figure 2:
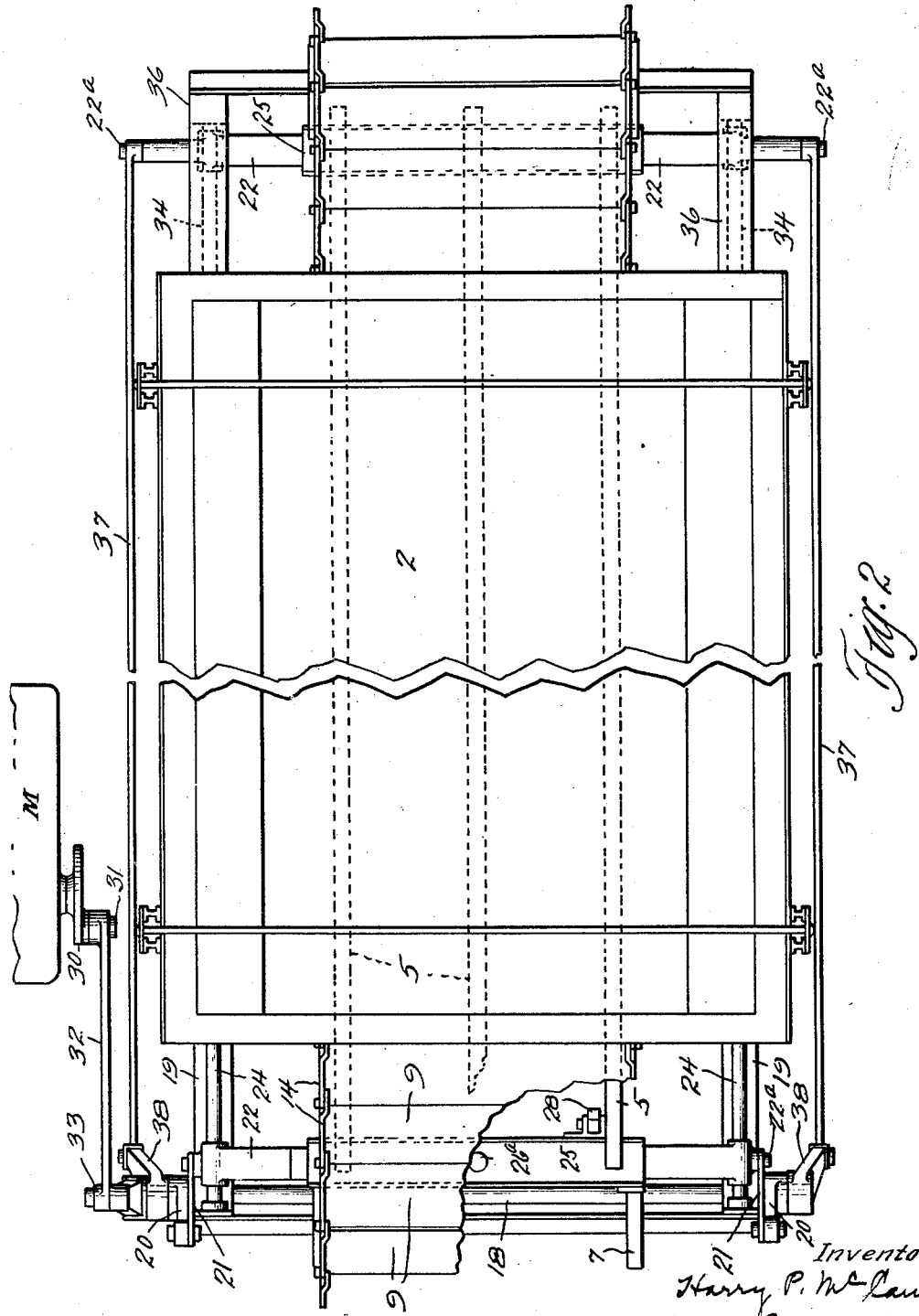

Referring to the drawings, Fig. 1 represents a side elevation of a furnace of the annealing type having my invention applied thereto; Fig. 2, a plan view, with parts broken away, of the assembly shown in Fig. 1; Fig. 3, a detail in vertical section through the furnace and the assembly referred to; Fig. 4, a detail in plan of one of the pans constituting part of the conveyer; Fig. 5, a sectional end elevation of the said pan and of a portion of the furnace with which it is associated, the view being taken on line 5—5 of Fig. 4; Fig. 6, a detail in section corresponding to the line 6—6 of Fig. 4; Fig. 7, a detail in side elevation, with parts broken away, showing the manner of connecting the pans, and one of the horizontal supporting rails therefor: Fig. 8, a detail in plan of the parts shown in Fig. 7; Fig. 9, a detail in elevation of a portion of the rear end of the furnace and of the pans; Fig. 10, a view similar to Fig. 8, showing the positions of the pans and of the pins in the sockets on the parts of the conveyer which are moving around the curved extension of the horizontal supporting rails; Fig. 11, a detail in plan and Fig. 12, a detail in elevation, of part of the mechanism for intermittently advancing the pans through the furnace; and Fig. 13, a detail in section corresponding to the line 13—13 of Fig. 12.

The complete assembly shown herein comprises a furnace having upper and lower supporting rails for the pans which are connected to form an endless conveyer, mechanism for intermittently moving the conveyer by pushing each pan in turn against the pan in front thereof, and special connections between the pans, permitting their convenient assembly to form a conveyer and serving to retain the pans in driving engagement while passing around the end portions of the supporting rails.

Describing the parts by reference characters, 1 denotes the side walls, 2 the top wall, and 3 the bottom wall of a furnace of the annealing type, the said furnace having a heat-treatment chamber A therein, beneath a perforated arch B, and an upper combustion chamber C (see Fig. 1) delivering products of combustion through flues D in the side walls 1 beneath supporting beams 4 extending transversely of the chamber A and carrying upper rails 5 on which the pans are supported as they are fed through the chamber A. Supported by the bottom wall 3, below the beams 4, are rails 6 along which the pans are moved in inverted position from the front to the rear of the furnace, for recharging. 7 denotes curved rearwardly and downwardly projecting extensions of the rails 5 at the rear of the furnace and 8 denotes similar extensions at the front of the furnace.

The construction of the individual pans whereby they are connected and supported upon the rails will now be described. Each pan consists generally of a metal article-supporting plate 9 having shallow front and rear transverse flanges 9ª and 9ᵇ. The bottom of each plate is provided adjacent each side thereof with a pair of downwardly projecting ribs 10 adapted to engage the top of the I-beam rail 5 therebeneath. Each pan is provided, immediately back of the front flange 9$^a$ thereof and adjacent to but located inwardly from the ribs 10 at each side thereof, with an upwardly projecting pocket 11, there being a downwardly inclined rib 12 extending from the rear of each pocket to the bottom of a central transversely extending rib 13. The ribs 10, 12 and 13 and the flanges 9$^a$ and 9$^b$ are preferably of the same depth.

At each side, each pan is provided with a side wall comprising a front portion 14 and a rear portion 14$^a$ connected by a forwardly and inwardly inclined portion 14$^b$. The front portion 14 of each side wall is extended beyond the front of the pan proper, and such front extension has a triangular front end 14$^c$; and the rear portion of each pan is provided at each side thereof with a notch 15 extending forwardly from the rear edge thereof for the reception of the lower part of the triangular projection 14$^c$ on the front of the side wall of the pan at the rear thereof. The rear end of each wall portion 14$^a$ is widened and provided with a socket, indicated generally at 16, and having a mouth 16$^a$ in the top thereof beneath which the socket extends rearwardly, as shown at 16$^b$, to prevent disengagement therefrom of the pin 17 which is carried by the portion 14 of the side wall of the pan at the rear thereof. The mouths of the sockets 16 are of greater width than the diameters of the cooperating pins, whereby the pins may be entered into the sockets and the pans assembled end-to-end in a convenient manner.

In order to operate the conveyer intermittently, the following construction is employed:—

18 denotes a rock shaft which is journaled in a pair of brackets 19 projecting from the rear of the furnace. Rigid with this rock shaft and projecting upwardly from opposite ends thereof are the arms 20. Each of these arms is connected by a link 21 with the reduced end 22$^a$ of a cross head comprising a bar 22 provided at each end thereof with a sleeve 23 by means of which the cross head is slidably mounted on the longitudinally extending rods 24. The extensions 22$^a$ are formed with the said sleeves. The cross head carries pivoted pawls adapted to engage the pockets 11 in each pan whereby, through the reciprocation of the cross head, the pans are advanced intermittently through the chamber A. As a means for conveniently mounting the pawls on the bar 22, I form a housing consisting of upper and lower channel members 25 connected by vertical plates 26, 27, the plates 27 being connected to the fronts of the channel members and the plates 26 to the rears of said members. Each plate 27 is provided with a pair of forwardly projecting lugs 27$^a$ between which there is pivoted a pawl for imparting movement to the conveyer pans. The housing and the bar 22 are further connected by means of a pin 26$^a$ extending through the central portions of the housing members 25 and through the bar 22, the bar being provided with bosses 22$^a$ engaging the members 25 and spacing them from the body of the said bar.

Each pawl comprises a body 28 pivotally supported between the lugs 27$^a$ by means of a pin 29; also a forwardly and upwardly projecting portion 28$^a$, the upper end of which is beveled upwardly and forwardly, as shown at 28$^b$, to conform to the bottoms of the pockets 11 with which it cooperates. Each pawl also comprises a downwardly extending portion 28$^c$ having its lower end weighted, as shown at 28$^d$. The body portion has a rear projection 28$^e$ which is adapted to engage the vertical face of the plate 27.

The rock shaft 18 is operated by means of a crank disk 30 mounted on a shaft 31 which is driven from any source of power, as by a motor, indicated generally at M. A connecting rod 32 is pivotally connected at one end to the crank disk 30 and at its opposite end to an arm 33 rigid with the rock shaft.

A cross head similar to that described hereinbefore is mounted on rods 34 supported at their front ends in sleeves 35 carried by brackets 36 at the forward end of the furnace. The rear ends of the rods 34 may be supported in any convenient manner from the front of the furnace. As the front cross head is substantially the same in construction as the rear cross head, the parts of the front cross head which appear herein will be designated by the same reference characters as are applied to the rear cross head.

The front cross head is operated by means of links 37 pivotally connected at their rear ends to arms 38 rigid with the rock shaft 18 and carried by opposite ends of said shaft, the front ends of the links being connected to the reduced ends 22$^a$ of the front cross head. The front cross head carries pawls of the same construction as the pawls on the rear cross head and the front and rear pawls are identified by the same reference characters. However, the pawls on the front cross head are reversed with respect to the pawls on the rear cross head, having their operating ends 28$^a$ extending downwardly and rearwardly and the weighted ends 28$^d$ extending upwardly and rearwardly.

With the parts constructed and arranged as described, it is believed that the operation will be readily understood. The pans may be conveniently assembled into a conveyer of any desired length by entering the pins 17 on the front of one pan into the sockets 16 at the rear of the pan in front thereof. Should it be desired to disassemble the conveyer, the pans may be readily separated by lifting the pins at the front of one pan out of the sockets at the rear of the pan in front thereof, it being noted that, for convenience of description, the left hand end of the apparatus shown in Fig. 1, has been referred to as the "rear" end and the opposite or delivery end as the "front" end. The material to be treated will be placed on the pans at the rear or loading end of the apparatus, the shaft 18 will be rocked by means of the crank 30, link 32 and arm 33. This rocking of the shaft will cause the reciprocation in opposite directions of the rear and front cross heads. On forward movement of the rear cross head, the upper ends of the pawls 28ª will operate against the front walls of the pockets in the pans in succession, the stroke of each cross head being preferably equal to the width of a pan so that the pans will be fed intermittently a distance equal to such width for each such stroke. As the rear cross head is moved rearwardly, the upper beveled end of each pawl rides along on the corresponding ribs 12 and 12ª against the action of the weighted end 28ᵈ.

When the pawl passes beyond the rib 12ª and the flange 9ᵇ of one pan and the flange 9ª of the pan at the rear thereof, it enters the pocket in the next pan to the rear. The shaft will then be rocked again, and the operation will be repeated, pushing the conveyer step-by-step along the rails 5 and through the chamber A.

Meanwhile, the pawls on the cross head at the front of the furnace are being operated in like manner to push the lower reach or course of the conveyer along the rails 6.

It will be noted that the pans are in engagement with each other throughout substantially the entire width thereof, the flange 9ª on one pan abutting against the flange 9ᵇ on the next adjacent pan. During the entire feeding movement of the conveyer on the rails 5 and 6, there will be no pull exerted between the pins 17 and the sockets 16. Due, however, to the action of gravity on the pans as they pass around the curved extensions 7 and 8 of the rails 5, the connections afforded by the pins and sockets will be under tension, as will appear from Figs. 9 and 10. However, as soon as a pan shall have passed beyond such curve, the pawls will operate upon it and the pushing action will be resumed, and the pans and the conveyer of which they form a part will be fed by such pushing action throughout the remainder of their travel. The undercutting of the sockets at 16ᵇ provides a lost-motion connection between the pans and enables the pans to remain in operative engagement while passing around the curved extensions 7 and 8, without danger of being unlocked. Furthermore, while the pans are traversing the furnace, as well as while passing around the rail extensions 7 and 8, they are maintained against lateral movement with respect to one another by means of the slots 15 and the side rail extensions 14ᶜ. As will be noted in connection with Figs. 1 and 9, these extensions overlap the rear ends of the sides of the pans in front thereof while traversing the rails 5 and 6, as well as while passing around the curved extensions 7 and 8.

Having thus described my invention, what I claim is:

1. In an apparatus of the character described, the combination of upper and lower rails, a plurality of article carriers loosely connected to form a flexible endless conveyer and supported on said rails, each of said article carriers having front and rear surfaces adapted to be engaged by corresponding cooperating surfaces on the carriers in front and rear thereof, means arranged to engage successively the carriers at the rear of the upper rails thereby to advance the conveyer by pushing the carriers against the carriers in front thereof, and means arranged to engage the carriers at the front ends of the lower rails, thereby to advance the lower portion of the conveyer by pushing the carriers successively along such lower rails, said last means including pivoted pawls positioned adjacent the ends of the upper and lower rails which the carriers first contact, parts for supporting said pawls, a pivoted member, links connecting said member with said parts for reciprocating the latter, and means for oscillating said pivoted member.

2. A conveyer element comprising an elongated body having front and rear vertical flanges, a pin projecting outwardly from each side of the front portion of said body and a pin-receiving socket extending outwardly from each side of the rear portion thereof, said element being provided with a pocket on the under side thereof adapted to be engaged by a reciprocable feeding member, said pocket having a vertical front wall, and a beveled portion therein connecting the bottom thereof with the edge of the rear wall.

3. A conveyer element comprising an elongated body having front and rear vertical flanges, a pin projecting outwardly from each side of the front portion of said body and a pin-receiving socket extending outwardly from each side of the rear portion thereof, said element being provided with a pocket on the under side thereof adapted to be engaged by a reciprocable feeding member, said pocket having a vertical front wall, and a beveled rib portion therein connecting the bottom thereof with the edge of the rear wall.

In testimony whereof I hereunto affix my signature.

HARRY P. McCANN.